Aug. 29, 1961 DE LOSS J. TANNER 2,998,479

CIRCUIT FOR REPRODUCING COLOR SIGNAL SUBCARRIER

Filed Sept. 30, 1957 3 Sheets-Sheet 1

INVENTOR.
De Loss J. Tanner
BY Donald W. Phillips
ATTORNEY

Aug. 29, 1961 DE LOSS J. TANNER 2,998,479

CIRCUIT FOR REPRODUCING COLOR SIGNAL SUBCARRIER

Filed Sept. 30, 1957 3 Sheets-Sheet 2

INVENTOR.
De Loss J. Tanner
BY Donald W. Phillips
ATTORNEY

INVENTOR.
De Loss J. Tanner
BY Donald W. Phillion
ATTORNEY 2,998,479

CIRCUIT FOR REPRODUCING COLOR SIGNAL SUBCARRIER

De Loss J. Tanner, Chicago, Ill., assignor to Admiral Corporation, Chicago, Ill., a corporation of Delaware
Filed Sept. 30, 1957, Ser. No. 687,111
6 Claims. (Cl. 178—5.4)

This invention relates to means for employing a portion of the multivibrator used in generating the horizontal deflection signals of a color television receiver to gate and to amplify the color bursts, thus eliminating the vacuum tube that is ordinarily employed for such gating and amplifying purposes.

There exists, in some present-day color television receivers, a multivibrator whose function is to participate in the generation of the horizontal deflection signals for the picture tube. One of the two tubes (or tube sections) of this multivibrator is conductive only during the time intervals corresponding substantially to the time intervals of the blanking periods which include the color synchronizing signal bursts (color bursts). The output signal of the last-mentioned tube, which is known as the discharge section of the multivibrator, is supplied to a horizontal output tube which, as will be discussed later herein, is cut off during the intervals of time corresponding substantially to the blanking periods. Thus, as will be discussed in detail later, the discharge section of the multivibrator can be employed to gate and amplify the color bursts without interfering with the horizontal deflection signals which are shaped after the horizontal oscillator stage. Consequently, the vacuum tube and associated circuitry that is ordinarily employed to gate and amplify the color bursts can be eliminated.

An object of the invention is to reduce the number of vacuum tubes required in a color television receiver.

Another object of the invention is to utilize a portion of the multivibrator ordinarily employed in the generation of horizontal deflection signals to gate and amplify the color burst signals.

A further object of the invention is to simplify and reduce the cost of color television receivers.

A fourth object of the invention is the improvement of color television receivers, generally.

In accordance with the invention, the composite chrominance signal is supplied to the control grid of the discharge section of the multivibrator. Since the color burst signals occur during the blanking periods of the composite chrominance signal, the discharge portion of the multivibrator will function to gate and amplify the color burst signals. A filter circuit is provided in the output circuit of the discharge section of the multivibrator to present a high impedance to said color burst signals. Another impedance circuit is provided in the output circuit of the discharge section of the multivibrator to form, from the 15,750 cycler per second output signal produced by the multivibrator, a trapezoidal shaped signal which is supplied to the horizontal output tube. The horizontal output tube functions to respond to the trapezoidal signal to produce, in cooperation with the horizontal output transformer, the horizontal deflection signals.

The above-mentioned and other objects and features of the invention will be more fully understood from the following detailed description thereof when read in conjunction with the drawings, in which.

Figure 1:
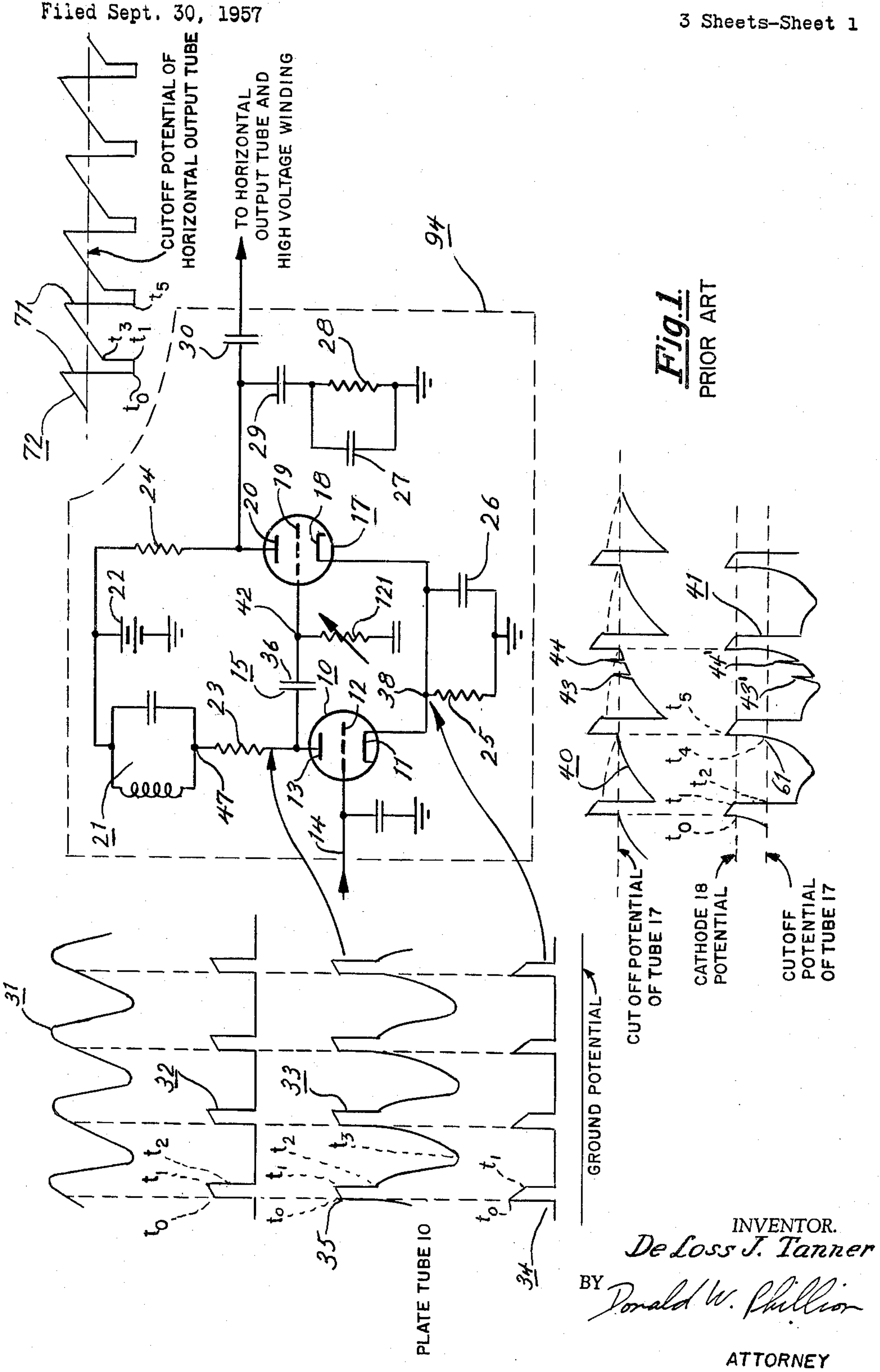
FIG. 1 is a schematic diagram of the prior art.

Referring now to the circuit of FIG. 1, a description of the multivibrator employed in the prior art for producing the horizontal deflection signals will be given in order to provide a background for an easier understanding of the invention.

Generally speaking, the function of the multivibrator is to produce a continuous series of pulses having a repetition rate of 15,750 cycles per second, which is the horizontal scanning frequency of a television receiver. The curves 33 and 41 represent the waveforms of the voltages that exist at the plate 13 of the tube 10 and the control grid 19 of tube 17, respectively. The waveforms 32 and 40 represent the potentials that would exist at the plate 13 of tube 10 and the control grid 19 of the tube 17 in the absence of the ringing circuit 21, which produces an output signal, as represented by the curve 31, which performs the function of altering the shapes of the aforementioned waveforms 32 and 40 to the shapes of the waveforms 33 and 41, respectively. The advantage of such alteration of the waveforms will be discussed in detail later. Let it suffice for now that the altered waveforms will minimize the possibility of premature triggering of the tube 17. It should be noted that the waveforms 31, 32, 33, 40, 41 and 72 are all drawn with the same time scale along their abscissas.

In the operation of the device, assume that the tube 10 has just become non-conductive at time $t_0$ and that its plate potential is operating at the point 35 on the curve 33. A this time the plate 36 of the capacitor 15 is positive with respect to the cathode 18 of tube 17 (as shown at the time $t_0$ of curve 41) and the tube 17 is conducting a maximum plate current. However, also as shown in the curve 41, during the interval of time between $t_0$ and $t_1$ the plate 36 of capacitor 15 discharges through the grid 19 cathode 18 gap of the tube 17 and the resistor 25 (which has a much smaller resistive value than the resistor 121). As the potential of the plate 36 of the capacitor 15 decreases the current flow (grid current) across the grid 19-cathode 18 gap and through the resistor 25 will also decrease, thus decreasing the potential of the point 38, as indicated in the waveform 34. At time $t_1$ the potential of the point 38 (and the potential of cathode 11 of tube 10) will have decreased to a value where the tube 10 will begin to conduct. As soon as a plate current in the tube 10 is initiated the potential of the plate 13 thereof will decrease. This decrease in the potential of the plate 13 is reflected through the capacitor 15 and functions to decrease the potential of the grid 19 of tube 17 and thus further decrease the plate current of tube 17. Such further decrease in the plate current of tube 17 will function to further decrease the effective grid bias of tube 10 and thus further increase the plate current of tube 10. This cycle continues until the tube 17 is cut off, which occurs very quickly after time $t_1$, at about time $t_2$.

It will be noted that owing to the characteristics of the tube 10, the plate current of the tube 10 will continue to increase after the tube 17 is cut off, and consequently the potential of the plate 13 will continue to decrease, thus driving the potential of the grid 19 of tube 17 below that indicated at time $t_2$ in curve 41. Another factor in determining the potential waveform 41 of the grid 19 is the presence of the signal generated by the ringing circuit 21. At about time $t_3$ it can be seen from the waveform 41 that the potential of the plate 36 of capacitor 15 will begin to increase in a positive direction until it reaches the point 61 (curve 41) at time $t_4$. The potential represented by the point 61 is the cutoff potential of tube 17. At time $t_4$, then, the tube 17 will begin to conduct, thus increasing the potential of the point 38. This increase in potential of the point 38 will function to increase the effective grid bias of the tube 10, thus increasing the plate 13 potential. Increase of the plate 13 potential will be reflected to the grid 19 of the tube 17 through the capacitor 15 to further increase the plate current of tube 17. This process continues until the tube 10 is cut off, which occurs at about time $t_5$ in the curve 41. The cycle is now completed and begins anew.

The function of the ringing circuit 21, which is tuned to a frequency approximately equal to the horizontal scanning rate e.g., 15,750 cycles per second, will now be discussed. The oscillations of the ringing circuit 21 are sustained by the periodic bursts of energy supplied thereto by the 15,750 per second signal pulses appearing at the plate 13 of the tube 10. Further, the phase of the oscillating signal produced by the ringing circuit 21 is controlled by the pulses supplied from the tube 10, which function to force the potential of the point 47 in a positive direction each time such pulses occur, thus determining the position of the positive slope of the sine wave 31 and maintaining a substantially constant phase relationship between the sine wave 31 and the output pulses of the tube 10.

As indicated before, the curve 40 represents the waveform of the signal that would exist at the point 42 in the absence of the ringing circuit 21. It will be noted that under such conditions the noise pulses 43 and 44 (curve 40) would function to trigger the tube 17 prematurely, since their peak amplitude is greater than the cutoff potential of the tube 17. However, also as discussed hereinbefore, by supplying the sine wave output signal from the tank circuit 21 to the plate 13 of the tube 10 the waveform of the signal obtained at the plate 36 of capacitor 15 (point 42) will have a shape as represented by the curve 41. It will be observed that the noise pulses 43' and 44' no longer extend above the cutoff potential of the tube 17 and thus will not prematurely trigger the tube 17.

As is well known in the art, the horizontal output tube (not shown) is cut off suddenly and completely during a portion of each cycle (15,750 c.p.s.) in order to permit the electro-magnetic field in the horizontal output transformer (also not shown), which form a part of the horizontal output tube load, to collapse very rapidly and thus produce the desired high voltage. The horizontal sweep signals are derived from the horizontal output transformer in a well known manner. It is to be noted that the integrating circuit comprising the capacitor 29 and the resistor 24 and the voltage dropping resistor 28 function to produce the trapezoidal output signal represented by the curve 72. As is indicated in the curve 72, the horizontal output tube is cut off at least during the blanking periods of composite video signal, which includes the time intervals that the tube 17 is conductive. Thus, during these conductive periods the tube 17 is available for performing functions other than participating in the generation of the high voltage and the horizontal deflection signals.

Figure 2:
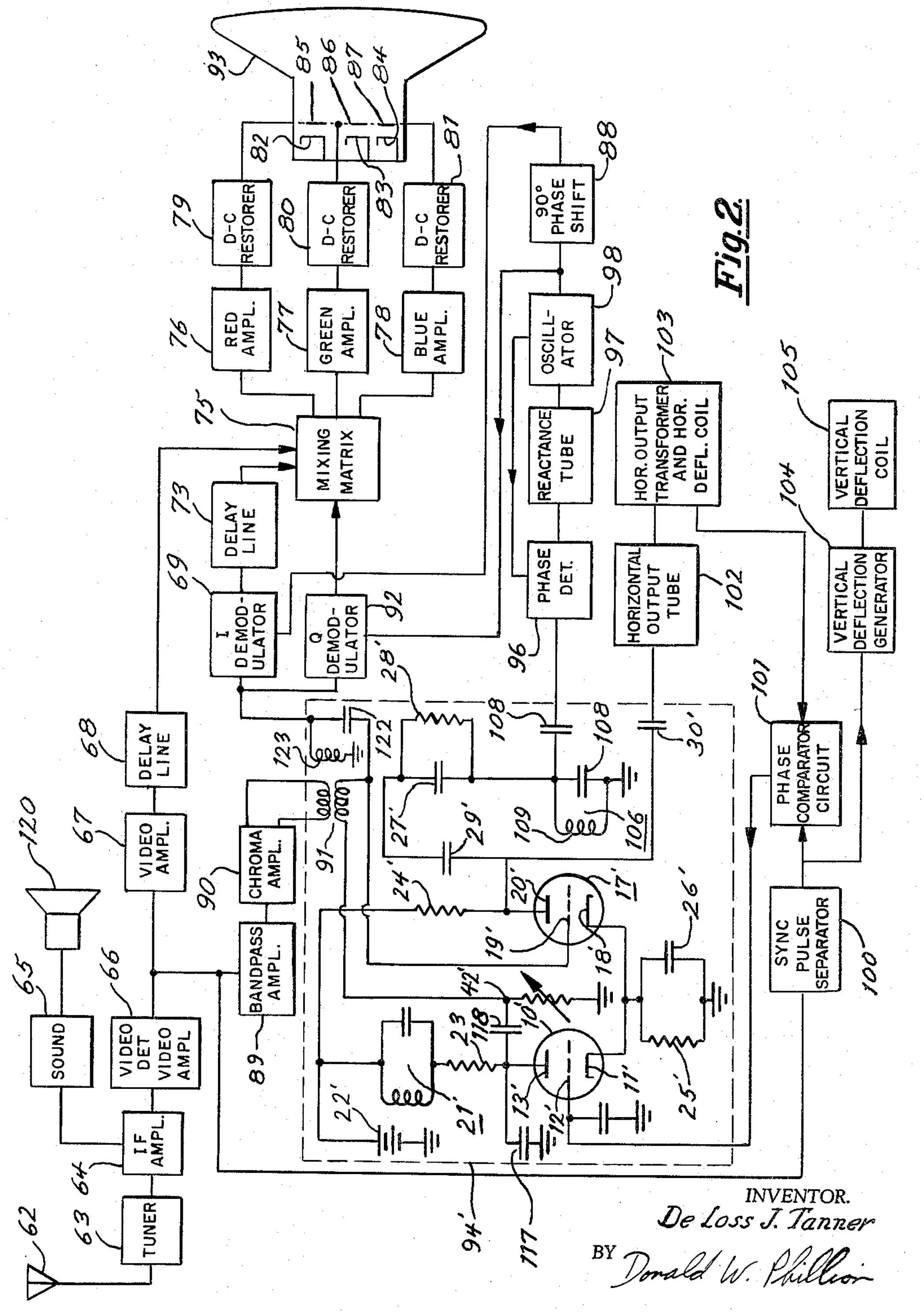
FIG. 2 is a combined schematic diagram and block diagram showing the invention and its relationship to a color television receiver.

Referring now to FIG. 2, there is shown in schematic diagram form a specific embodiment of the invention. There is also shown in FIG. 2 the remaining portions of a television receiver in block diagram form to provide background for the purpose of showing how and where the invention fits into a television receiver. The block diagram will be briefly described first. For a more detailed account of the overall system shown in FIG. 2, reference is made to a publication entitled "LB–925 R.C.A. Development Color Television Receiver" and published by the Radio Corporation of America, RCA Laboratories Division, Industry Service Laboratory.

The transmitted television signal is intercepted by the antenna 62, which supplies said signal to the tuner 63 and thence to the intermediate frequency (IF) amplifying section 64. The sound channel 65 responds to the output of the IF amplifying section 64 to derive the audio signal which drives the speaker 120.

The output of the IF section 64 is also supplied to the video detector and to a stage of video amplification, both of which are included within the block 66. From this point the signal is supplied to the mixing matrix 75 through two different circuit paths, which are as follows: The first path is the luminance or monochrome circuit comprising video amplifier 67 and the delay line 68. The second path is the chrominance circuit including the band-pass amplifier 89, the chroma amplifier 90, the Q demodulating circuit 92, and I demodulating circuit 69, and the delay line 73. The function of the chrominance circuit is to reobtain the original I and Q voltages, the definitions of which are well known in the art and which are set forth in the RCA publication recited hereinbefore. The I and Q voltages, and the monochrome signal, are supplied to the mixer circuit 75, where the original color signals are reobtained. The original color signals are then supplied in parallel through the red amplifier 76 and the D.-C. restorer 79, the green amplifier 77 and the D.-C. restorer 80, and the blue amplifier 78 and the D.-C. restorer 81, to the grids 85, 86, and 87, respectively, of the tri-gun kinescope 93, which also contains the three cathodes 82, 83, and 84.

For the transmission purposes, the color subcarrier signal was removed from the I and the Q signals, but must be reinserted before the I and Q signals can be demodulated. The function of the color bursts, which are transmitted, is to provide a reference signal for the reproduction of the color subcarrier signal. The color bursts are separated from the composite video signal by means of the present invention shown within the block 94', which will be described in more detail later. Then the separated color bursts are supplied through a phase detector 96 and a reactance tube 97 to an oscillator 98. The phase and frequency of the output signal of the oscillator 98 are accurately controlled by the phase detector 96 and the reactance tube 97, which function in a well-known manner. More specifically, the output signal of the oscillator 98 and the color burst signal are compared in the phase detector 96 to produce a signal whose amplitude varies as the phase of the two signals varies. Reactance tube 97 is responsive to the output signal of the phase detector 96 to control the phase of the output signal of the oscillator 98. The oscillator output signal is supplied directly to the Q demodulator 92 and to the I demodulator 69 through the 90° phase shift circuit 88.

The synchronizing pulse separator circuit 100 supplies its output to the phase comparator 101 to which is supplied, also, a sawtooth shaped signal generated within the block 103. Such a sawtoothed shaped signal is derived from the signal generated in the horizontal output transformer by well known means and has a phase which bears a known and constant relationship with the phase of the horizontal deflection signals. The phase comparator 101 compares the phases of these two signals supplied thereto and supplies to the control grid 12' of the tube 10' a D.-C. voltage whose magnitude varies as the phase relationship of the two signals varies. Such a D.-C. signal functions to maintain the phase of the output signal of the multivibrator shown within the block 94' in proper relationship to the phase of the horizontal synchronizing pulses. The vertical deflection signal generator 104 and the vertical deflection coil 105 function in a well known manner. The general function of the horizontal output tube circuit 102 and the horizontal output transformer and horizontal deflection coil represented by the block 103 has been described hereinbefore.

Referring now specifically to the circuitry within the dashed line block 94', there is shown a form of the invention. It is to be noted that the structure within the block 94' is substantially the same as the prior art structure within the dashed line block 94 of FIGURE 1, except that in the case of the structure of FIGURE 2 the composite chrominance signal is supplied between the point 42' and the control grid 19' of the tube 17'. It is to be noted that the point 42' is connected to ground potential through the capacitors 118 and 117, which constitute substantially a short circuit for the color burst signals. Since the cathode circuit capacitor 26' also presents only a very low impedance to the color burst signals, the said color burst signals substantially are applied across the grid 19' and the cathode 18' of the tube 17'. It is the combination of the multivibrator shown within the block 94' and the structure for supplying the composite chrominance signal to the grid 19' of the tube 17' that constitutes the essence of this invention. As discussed hereinbefore, the tube 17' is conductive during the occurrence of the color bursts. This will be more apparent from an examination of the waveform of FIGURE 6, which represents the output signal appearing at the plate 20' of tube 17' (FIG. 2) and which is substantially the same as the trapezoidally shaped waveform of the output signal appearing at the plate 20 of tube 17 (FIG. 1) except that in the waveform of FIG. 6 the color bursts, such as bursts 113, 114, 115, and 116, are superimposed on the trapezoidally shaped component.

These color bursts appear across the tuned circuit 106, comprising coil 109 and capacitor 108, which is tuned to the frequency of the color bursts (about 3.58 megacycles). The coil 109 presents substantially a short circuit to the much lower frequency (15,750 c.p.s.) signal having the trapezoidally shaped waveform. Thus, the tuned circuit 106 will have practically no effect on the aforesaid trapezoidally shaped signal. On the other hand, the circuit comprising resistor 28' and the integrating circuit consisting of resistor 24' and capacitor 29' which functions to produce the trapezoidally shaped signal from the 15,750 c.p.s. pulses appearing at the plate 20' of tube 17', presents practically no impedance to the 3.58 megacycle signal. Thus, the 3.58 megacycle color bursts appear only across the tuned circuit 106 and the 15,750 c.p.s. trapezoidally shaped signal appears only across the capacitor 29' and the resistor 28'.

Figures 3, 4, 5, 6:
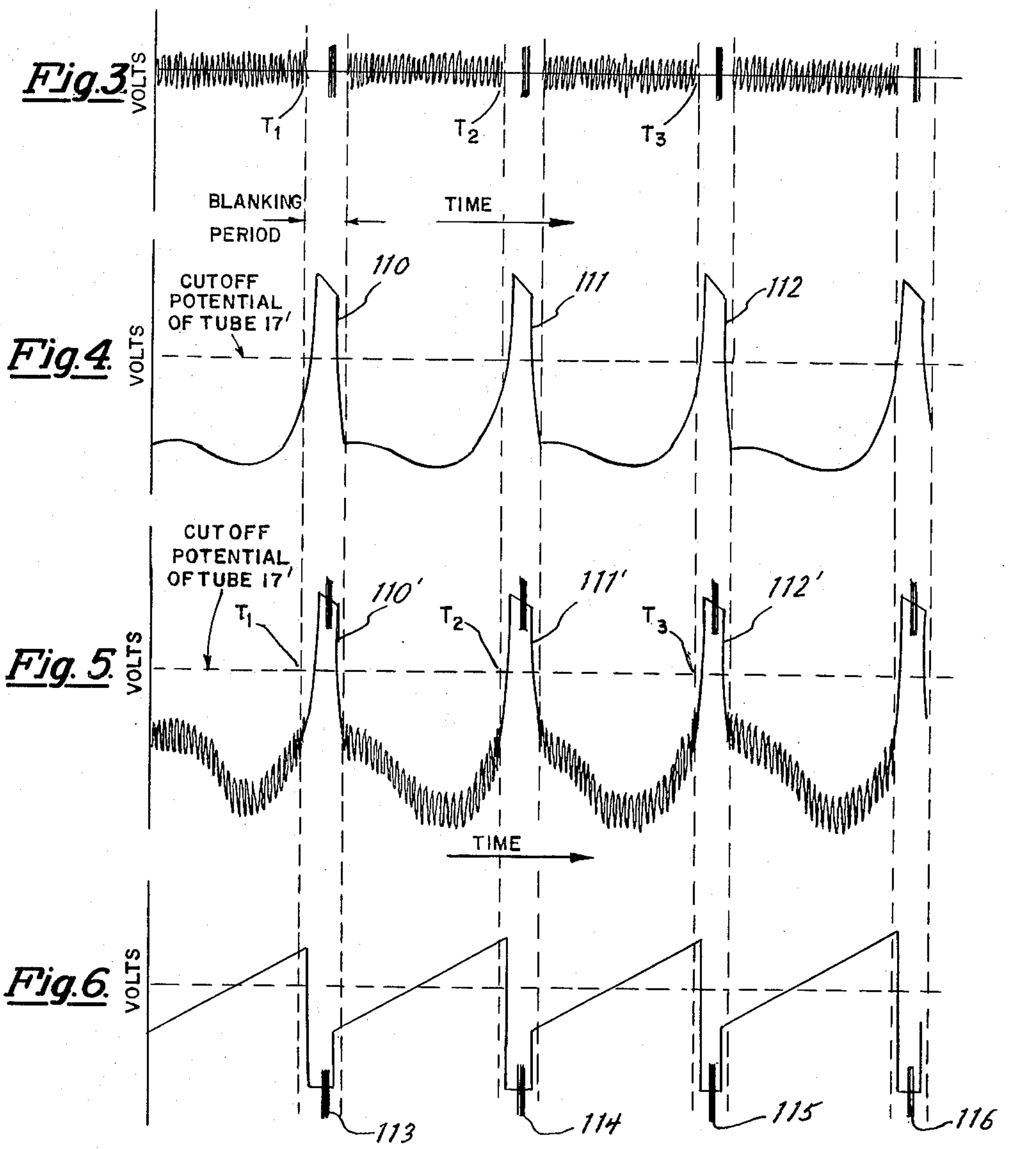
FIGS. 3 through 6 show voltage waveforms at various points in the circuit of FIG. 2.

The effect of supplying the composite chrominance signal to the grid 19' of tube 17' will now be discussed in more detail with the aid of the curves of FIGS. 3, 4, and 5. In FIG. 3 there is shown a typical waveform of the composite chrominance signal supplied to the grid 19' of tube 17'. It will be noted that due to the frequency response characteristics of the bandpass amplifier 89 and to the action of the transformer 91, the low frequency components, including the blanking pulses, do not appear therein. It is to be further noted that the average magnitude of the chrominance signal is considerably less than the magnitude of the signal (FIG. 4) appearing at the point 42', as a result of the action of the multivibrator. Thus, when the two signals represented by the waveforms of FIGS. 3 and 4 are combined to produce the waveform of FIG. 5, there will be no appreciable change in the operation of the multivibrator. Since the leading edge of the pulses (such as pulses 110, 111, and 112 shown in FIG. 4) occur later than the leading edges of the blanking pulses which occur at times indicated by the reference characters $T_1$, $T_2$, and $T_3$, there will be an interval of time between the cessation of the video signal and the beginning of the pulses, such as pulses 110, 111, and 112. This interval of time will function to protect against premature triggering of the tube 17' due to the video signal. More specifically, it can be seen from an examination of the curve of FIG. 5 that if the leading edge of the pulse 110' occurred at the same time as the leading edge of the blanking pulse (i.e., at time $T_1$) then the video signal immediately preceding the pulse 110' could very easily raise the potential of the curve of FIG. 5 above the cutoff level and thus trigger the tube 17' prematurely.

The capacitor 122 and the inductor 123 constitute a filter circuit which functions to isolate the 15,750 c.p.s. signal appearing at the point 42' from the demodulators 69 and 92.

It is to be understood that the chrominance signal, including the color bursts, may be supplied to the multivibrator in manners other than the particular manner described herein. For example, the chroma signal may be supplied to the cathode of the tube 17, rather than to the grid. However, these alternative arrangements are matters of design and the claims of this application are intended to include such alternative forms. Further, other changes can be made in the form of the invention described herein without departing from the spirit or scope thereof.

I claim:

1. In a television receiver of the type adapted to reproduce images from a signal train comprising video signals, blanking pulses, line frequency synchronizing signals superimposed upon said blanking pulses and bursts of alternating current waves combined with said blanking pulses; means for generating deflection signals of the same frequency as said line frequency synchronizing signals including oscillator means and electron valve discharge means coupled to said oscillator means; means for rendering said electron valve discharge means conductive only during time intervals corresponding to the occurrence of said blanking pulses; an output circuit connected across said electron valve discharge means; means for coupling said signal train to said electron valve discharge means; first means in said output circuit responsive only to the frequency of said bursts of alternating current waves; and second means in said output circuit responsive only to said generated deflection signals.

2. In a television receiver of the type adapted to reproduce images from a signal train comprising video signals, including chroma information, blanking pulses, line frequency synchronizing signals superimposed upon said blanking pulses and high frequency color burst signals having the same frequency as said chroma information combined with said blanking pulses; means for generating deflection signals of the same frequency as said line frequency synchronizing signals including oscillator means, said oscillator means including electron discharge means conductive only during time intervals corresponding to said blanking pulses; means for maintaining the frequency of said oscillator means equal to the frequency of said line frequency synchronizing signals; and means for separating and amplifying said color bursts comprising; means for coupling said chroma information and said color bursts to said discharge means in said oscillator means, an output circuit for said discharge means and means in said output circuit responsive to the frequency of said color bursts.

3. In combination in a color television receiver having means for deriving a chrominance signal including color information components and recurrent bursts of a color reference frequency from a received composite television signal having video information components with said color information components superimposed thereon, blanking pulses, line synchronizing pulses superimposed on said blanking pulses and said color reference bursts combined with said blanking pulses; means for generating horizontal deflection signals in accordance with said line synchronizing pulses including oscillator means; said oscillator means including an electron discharge device conductive only during time intervals corresponding to the occurrence of said blanking pulses; an output circuit for said oscillator means; means for coupling said chrominance signal to said electron discharge device; first impedance means in said output circuit responsive to the output of said oscillator means; and second impedance means in said output circuit responsive to said color burst reference frequency, whereby said discharge device serves to separate said color bursts from said chrominance signal without affecting the operation of said oscillator means.

4. In combination in a color television receiver having means for deriving a composite chroma signal including color synchronizing bursts from a received composite television signal; means including a horizontal oscillator and a horizontal output circuit for producing horizontal deflection signals; said horizontal oscillator including a free-running multivibrator arrangement having first and second electronic valves each having respective input and output circuits; coupling means for supplying the output voltage of said first valve to the input circuit of said second valve; means for connecting the output circuit of said second valve with said horizontal output circuit whereby said horizontal output circuit is de-energized during the intervals corresponding to the occurrence of said color synchronizing bursts; means for supplying said composite chroma signal to the input circuit of said second valve; and circuit means in the output of said second valve for presenting a high impedance to said color synchronizing bursts and a low impedance to the signal produced by said horizontal oscillator.

5. The combination set forth in claim 4 wherein said second valve comprises an anode, a cathode and a control grid with said input circuit of said second valve including said cathode and said control grid and said output circuit of said second valve including said anode and said cathode.

6. In combination in a color television receiver having means for deriving a composite chroma signal including recurrent reference frequency color bursts from a received composite television signal; horizontal oscillator means for producing horizontal deflection signals; a free-running multivibrator in said horizontal oscillator means; a first electron valve and a second electron valve each including an anode, a cathode and a control element in said multivibrator; coupling means coupling the anode of said first valve to the control element of said second valve; means connected to the control element of said first valve for maintaining the frequency of said multivibrator equal to the frequency of recurrence of said color bursts; circuit means common to the cathodes of both said valves cooperating with said coupling means to drive said second valve conductive only during time intervals corresponding to the occurrence of said color bursts; means for applying said composite chroma signal to the control element of said second valve; and means connected to the anode of said second valve for presenting a high impedance to signals of said reference frequency and a low impedance to the signal produced by said multivibrator.

References Cited in the file of this patent

UNITED STATES PATENTS

| | | |
|---|---|---|
| 2,712,568 | Avins | July 5, 1955 |
| 2,728,812 | Bedford | Dec. 27, 1955 |
| 2,735,886 | Schlesinger | Feb. 21, 1956 |
| 2,883,452 | Macovski | Apr. 21, 1959 |